(12) United States Patent
Yan

(10) Patent No.: US 8,075,663 B2
(45) Date of Patent: Dec. 13, 2011

(54) ANTI-OXIDATIVE AGENT FOR MOLTEN METAL, METHOD OF PREPARING AND METHOD OF USING THEREOF

(75) Inventor: Yongnong Yan, Shenzhen (CN)

(73) Assignee: Shenzhen Kunqixinhua Technology Co., Ltd., Shenzhen (CN)

( * ) Notice: Subject to any disclaimer, the term of this patent is extended or adjusted under 35 U.S.C. 154(b) by 0 days.

(21) Appl. No.: 12/748,697

(22) Filed: Mar. 29, 2010

(65) Prior Publication Data

US 2010/0180726 A1 Jul. 22, 2010

Related U.S. Application Data

(63) Continuation of application No. PCT/CN2009/000038, filed on Jan. 13, 2009.

(30) Foreign Application Priority Data

Jan. 14, 2008 (CN) .......................... 2008 1 0065190
Jan. 12, 2009 (CN) .......................... 2009 1 0013926

(51) Int. Cl.
*C23F 11/173* (2006.01)
*C21B 3/04* (2006.01)
*B23K 35/34* (2006.01)
*C10M 169/04* (2006.01)

(52) U.S. Cl. ............... 75/300; 148/23; 148/25; 508/110
(58) Field of Classification Search .................... 75/300; 148/242

See application file for complete search history.

(56) References Cited

U.S. PATENT DOCUMENTS

| 3,597,285 | A | * | 8/1971 | Aronberg ...................... 148/261 |
| 4,341,558 | A | * | 7/1982 | Yashiro et al. ............. 106/14.12 |
| 4,606,833 | A | * | 8/1986 | Schuettenberg et al. ..... 508/431 |
| 7,052,558 | B1 | * | 5/2006 | Sabarese et al. ................ 148/23 |

* cited by examiner

*Primary Examiner* — Roy King
*Assistant Examiner* — Claudio J Herzfeld
(74) *Attorney, Agent, or Firm* — Matthias Scholl P.C.; Matthias Scholl

(57) ABSTRACT

An anti-oxidative agent for molten metal containing at least nonylphenol polyoxyethylene ether, organic amine, phosphoric acid, and phytic acid. A method of preparing the anti-oxidative agent for molten metal, by a) heating an organic amine to between 60 and 100° C., adding a nonylphenol polyoxyethylene ether, and stirring for between 3 and 5 min to yield a mixture; and b) cooling the mixture to between 30 and 100° C., and adding phosphoric acid and phytic acid and stirring for between 10 and 15 min. The anti-oxidative agent for molten metal has no flash point and spreads quickly on the liquid surface, providing high reduction efficiency at lost cost.

16 Claims, No Drawings

ANTI-OXIDATIVE AGENT FOR MOLTEN METAL, METHOD OF PREPARING AND METHOD OF USING THEREOF

CROSS-REFERENCE TO RELATED APPLICATIONS

This application is a continuation of International Patent Application No. PCT/CN2009/000038 with an international filing date of Jan. 13, 2009, designating the United States, now pending, and further claims priority benefits to Chinese Patent Application No. 200810065190.X filed Jan. 14, 2008, and to Chinese Patent Application No. 200910013926.3 filed Jan. 12, 2009. The contents of all of the aforementioned applications, including any intervening amendments thereto, are incorporated herein by reference.

BACKGROUND OF THE INVENTION

1. Field of the Invention

The invention relates to an anti-oxidative agent for molten metal, a method of preparing the same, and use thereof.

2. Description of the Related Art

In industrial production, it is common to melt a metal or an alloy so as to bind to or attach to another. However, most metals will be oxidized at presence of oxygen, such as the formation of iron rust. At high temperature, particularly at molten state, the oxidation of the metal or the alloy is very intense, resulting in oxide accumulation. Furthermore, in order to attach to another metal, the molten metal should flow circularly, which, on the one hand, accelerates the oxidation, on the other hand, brings the oxides and oxygen into the inside of the liquid metal. Thus, the oxidation further occurs inside the liquid metal and more and more metal dross containing the metal is produced, emerges, and accumulates. The metal dross inhibits the flow of the liquid metal or even overflows, which is dangerous and contaminates the equipment. Additionally, the metal dross cannot attach to metals and thereby must be removed. After removal of the metal dross, the height of the liquid metal surface decreases, the materials are not sufficient, so the addition of extra metal is required.

Therefore, in order to prevent the oxidation of the molten metal, anti-oxidative treatment is required. Conventional methods for anti-oxidation include reducing with a reductant, reducing with a reduction machine, and oxidation prevention with nitrogen, among which reducing with a reductant is common The practical reductants include a reducing powder, a reducing metal, and a viscous colloidal agent.

The working mode of the reducing powder is to apply the powder to the surface of the liquid metal, but the method has the following disadvantages:
a) powdery reductant is inconvenient in practice, particularly for a molten metal having a large surface area, it is not easy to spray uniformly;
b) powdery reductant is prone to be easily ejected away from the molten metal, resulting in pollution and material waste;
c) powdery agents are generally acids, bases, or salts which will react with additives upon mixing with the molten metal, resulting in a large amount of smoke, which is very difficult to remove with conventional ventilation systems; and
d) as mentioned above, powdery agents are generally acids, bases, or salts, which do a great harm to human, equipment, and environment.

The working protocol for reducing a metal includes adding high purity of active substance (for example, a reducing powder) to a metal, cooling, preparing metal particle (or metal section), and adding the metal particle to a molten metal, but the method has the following disadvantages:
a) the preparation of reducing metal involves in a complicated process, resulting in a high cost;
b) prior to use, the reducing metal needs melting, which takes a long time, and the molten reducing metal is not easy to spread;
c) the alloy having the reducing metal is not absolutely the same as the target alloy to be protected, so the addition of the alloy having the reducing metal may destroy the metal proportion of the target alloy; and
d) the addition amount of the reducing metal should be accurate, which is difficult to control; excess reducing metal results in waste, increases the tension of the molten alloy, and decreases the adhesion.

The working mode of the viscous colloidal agent includes adding an active substance to a viscous liquid, mixing, adding the mixture to a molten metal, and stirring so as to spread on the surface to form a protective membrane, but the method has the following disadvantages:
a) the spread is slow and needs strong stirring; and
b) the viscous colloidal agent has strong adhesion and is prone to adhere to the molten metal and the equipment, resulting in contamination, blocking, and destruction.

SUMMARY OF THE INVENTION

In view of the above-described problems, it is one objective of the invention to provide an anti-oxidative agent for molten metal having good reductive effect and low cost.

It is another objective of the invention to provide a method of preparing an anti-oxidative agent for molten metal having good reductive effect and low cost.

It is further another objective of the invention to provide a use of an anti-oxidative agent for molten metal having good reductive effect and low cost.

To achieve the above objectives, in accordance with one embodiment of the invention, there is provided an anti-oxidative agent for molten metal having good reductive effect and low cost, the anti-oxidative agent for molten metal comprising nonylphenol polyoxyethylene ether, organic amine, phosphoric acid, and phytic acid.

In a class of this embodiment, the nonylphenol polyoxyethylene ether is between 51.19 and 91.19 weight parts, the organic amine is between 3 and 15 weight parts, the phosphoric acid is between 0.3 and 5 weight parts, and the phytic acid is between 0.5 and 8 weight parts.

In accordance with another embodiment of the invention, there is provided a method of preparing the anti-oxidative agent for molten metal having good reductive effect and low cost, the method comprising
a) slowly heating the organic amine to between 60 and 100° C., adding the nonylphenol polyoxyethylene ether, and stirring for between 3 and 5 min to yield a mixture; and
b) cooling the mixture to between 30 and 100° C., and adding the phosphoric acid and the phytic acid with stirring for between 10 and 15 min.

In accordance with still another embodiment of the invention, there is provided an anti-oxidative agent for molten metal having good reductive effect and low cost, the anti-oxidative agent for molten metal comprising nonylphenol polyoxyethylene ether, cyclohexylamine hydrobromide, diphenyl guanidine hydrobromide, phosphoric acid, and phytic acid.

In a class of this embodiment, the nonylphenol polyoxyethylene ether is between 51.19 and 91.19 weight parts, the cyclohexylamine hydrobromide is between 5 and 20 weight parts, the diphenyl guanidine hydrobromide is between 3 and 15 weight parts, the phosphoric acid is between 0.3 and 5 weight parts, and the phytic acid is between 0.5 and 8 weight parts.

In accordance with another embodiment of the invention, there is provided a method of preparing the anti-oxidative agent for molten metal having good reductive effect and low cost, the method comprising a) slowly melting the cyclohexylamine hydrobromide and the diphenyl guanidine hydrobromide, adding the nonylphenol polyoxyethylene ether, and stirring for between 3 and 5 min to yield a mixture; and b) cooling the mixture to between 30 and 100° C., and adding the phosphoric acid and the phytic acid with stirring for between 10 and 15 min.

The anti-oxidative agent for molten metal is a water-soluble oily liquid, without flash point, and when added to a molten metal, no splash produced, the resultant metal dross is water-soluble and is minimal.

In another aspect, the invention provides a method of anti-oxidation of molten metal comprising applying the anti-oxidative agent onto a molten metal.

In a class of this embodiment, the applying comprises directly pouring the anti-oxidative agent onto the molten metal.

In a class of this embodiment, the applying comprises a) inserting between 3 and 5 stainless steel sheets between 3 and 5 cm deep into the molten metal liquid so as to confine the flow thereof on the surface to a small area, and b) pouring the anti-oxidative agent onto the surface of the flow part of the molten metal.

In a class of this embodiment, the applying comprises a) disposing a U-shaped mesh screen on a vessel which is used to load the molten metal, the molten metal freely passing through the mesh screen but oxidized metal dross not, the edge of the vessel being between 1 and 2 cm higher than the metal liquid level, and b) pouring the anti-oxidative agent onto the liquid surface of the molten metal in the mesh screen.

Advantages of the invention are summarized as below:

1. Easy to Practice

The anti-oxidative agent for molten metal of the invention is a water-soluble oily liquid and can be directly poured onto the liquid surface of the molten metal as needed. Due to having a surfactant, when the oily liquid is mixed with the molten metal liquid, hydrophilic/hydrophobic bidirectional molecular bonds are produced, the molten metal surface tension reduced, which promotes the rapid and automatic spread of the anti-oxidative liquid, generally the surface is covered with the agent within 3-5 seconds. Additionally, the agent is floated on the surface of the molten metal, so the amount thereof needs not to be accurate, which benefits practice.

2. Providing Double Effects of Anti-Oxidation and Reduction

Conventional reduction methods only have a single function, for example, isolation prevention with nitrogen focuses on anti-oxidation, while metal particles/reducing powder focuses only on reduction.

The anti-oxidative agent for the invention is a liquid, which is lighter than a molten metal and floated on the surface of the molten metal, and thereby the oxidation is inhibited. Meanwhile, the agent has an active substance and an organic acid or an inorganic acid, which can destroy the internal force of metal dross and reduce valuable metal into a vessel.

3. Improving the Binding Capacity

The active substance (surfactant) of the anti-oxidative agent can reduce the surface tension of the molten metal and increase the fluidity and diffusibility of the molten metal, and thereby the binding and attachment capacity has been greatly enhanced, which is exactly the greatest advantage of the invention.

4. Low in Cost and Having High Quality to Price Ratio

The raw materials used in the invention are cheap and have high reduction efficiency (around 95%), so the unit cost for reducing metal is very low, and 50% metal per working section is saved.

5. Providing Pemarkable and Sustainable Reduction Effect

Upon pouring the anti-oxidative agent onto the molten metal, the existing and subsequent metal dross disappears quickly, and the reduction effect can last for between 4 and 5 hrs.

6. Providing a Clean Working Environment

Since oxides are reduced continuously, metal dross is very little. The resultant residues are water-soluble, non-sticky muddy substances, and easily removed by wiping or soaking in a cleaning agent, so it is very easy to keep the working environment clean.

7. Widely Applicable

The anti-oxidative agent has a wide application and can replace any agent and reduction method in prior art for solder such as dip soldering and wave soldering.

DETAILED DESCRIPTION OF THE EMBODIMENTS

For further illustrating the invention, experiments detailing an anti-oxidative agent for molten metal and a method of preparing the same are described below. It should be noted that the following examples are intended to describe and not to limit the invention.

An anti-oxidative agent for molten metal comprises between 51.19 and 91.19 weight parts of nonylphenol polyoxyethylene ether, between 3 and 15 weight parts of organic amine, between 0.3 and 5 weight parts of phosphoric acid, and between 0.5 and 8 weight parts of phytic acid.

The nonylphenol polyoxyethylene ether is used as an emulsifier, a wetting agent, a dispersing agent, a penetrant, a cleaning agent, and a solubilizer.

The organic amine is an organic surfactant (an organic compound), and can reduce the surface tension, alter the surface physico-chemical equilibrium conditions so as to wet the solder and the welded metal, reduce the oxides, and improve the soldering capacity.

The phosphoric acid is used as a catalyst of organic reaction, an additive of refractory materials, a treating agent for activated carbon, and so on.

The phytic acid is used as a chelating agent, an antioxidant, an anti-corrosion agent for metals, and so on.

Upon preparation, the organic amine was heated to between 60 and 100° C., the nonylphenol polyoxyethylene ether added slowly, and stirred for between 3 and 5 min to yield a mixture. The mixture was cooled to 60° C., and then the phosphoric acid and the phytic acid were slowly added with stirring for between 10 and 15 min.

Another anti-oxidative agent for molten metal comprises between 51.19 and 91.19 weight parts of nonylphenol polyoxyethylene ether, between 5 and 20 weight parts of cyclohexylamine hydrobromide, between 3 and 15 weight parts of diphenyl guanidine hydrobromide, between 0.3 and 5 weight parts of phosphoric acid, and between 0.5 and 8 weight parts of phytic acid.

The nonylphenol polyoxyethylene ether is used as an emulsifier, a wetting agent, a dispersing agent, a penetrant, a cleaning agent, and a solubilizer.

The cyclohexylamine hydrobromide is an organic surfactant (an organic halogen compound), and can reduce the surface tension, alter the surface physico-chemical equilibrium conditions so as to wet the solder and the welded metal, reduce the oxides, and improve the soldering capacity.

The diphenyl guanidine hydrobromide is an organic surfactant (an organic halogen compound), and can reduce the surface tension, alter the surface physico-chemical equilibrium conditions so as to wet the solder and the welded metal, reduce the oxides, and improve the soldering capacity.

The phosphoric acid is used as a catalyst of organic reaction, an additive of refractory materials, a treating agent for activated carbon, and so on.

The phytic acid is used as a chelating agent, an antioxidant, an anti-corrosion agent for metals, and so on.

Upon preparation, the cyclohexylamine hydrobromide and diphenyl guanidine hydrobromide were molten slowly, and then the nonylphenol polyoxyethylene ether added slowly, stirred for between 3 and 5 min to yield a mixture. The mixture was cooled to 60° C., and then the phosphoric acid and the phytic acid were slowly added with stirring for between 10 and 15 min.

Optionally, an appropriate amount of essence can be added to the anti-oxidative agent for molten metal so as to optimize the working environment.

Specifically, a formula of the anti-oxidative agent for molten metal is given below:

Formula 1

| | |
|---|---|
| Nonylphenol polyoxyethylene ether | 51.19 weight parts |
| Cyclohexylamine | 15 weight parts |
| Phosphoric acid | 5 weight parts |
| Phytic acid | 8 weight parts |

Formula 2

| | |
|---|---|
| Nonylphenol polyoxyethylene ether | 65 weight parts |
| Triethanolamine | 10 weight parts |
| Phosphoric acid | 3 weight parts |
| Phytic acid | 7 weight parts |

Formula 3

| | |
|---|---|
| Nonylphenol polyoxyethylene ether | 91.19 weight parts |
| Monoethanolamine | 3 weight parts |
| Phosphoric acid | 0.5 weight parts |
| Phytic acid | 0.3 weight parts |

Formula 4

| | |
|---|---|
| Nonylphenol polyoxyethylene ether | 51.19 weight parts |
| Hexanediamine | 15 weight parts |
| Phosphoric acid | 5 weight parts |
| Phytic acid | 8 weight parts |

Formula 5

| | |
|---|---|
| Nonylphenol polyoxyethylene ether | 75 weight parts |
| Diethanolamine | 20 weight parts |
| Phosphoric acid | 3 weight parts |
| Phytic acid | 7 weight parts |

Formula 6

| | |
|---|---|
| Nonylphenol polyoxyethylene ether | 51.19 weight parts |
| Cyclohexylamine hydrobromide | 20 weight parts |
| Diphenyl guanidine hydrobromide | 15 weight parts |
| Phosphoric acid | 5 weight parts |
| Phytic acid | 8 weight parts |

Formula 7

| | |
|---|---|
| Nonylphenol polyoxyethylene ether | 65 weight parts |
| Cyclohexylamine hydrobromide | 15 weight parts |
| Diphenyl guanidine hydrobromide | 10 weight parts |
| Phosphoric acid | 3 weight parts |
| Phytic acid | 7 weight parts |

Formula 8

| | |
|---|---|
| Nonylphenol polyoxyethylene ether | 91.19 weight parts |
| Cyclohexylamine hydrobromide | 5 weight parts |
| Diphenyl guanidine hydrobromide | 3 weight parts |
| Phosphoric acid | 0.5 weight parts |
| Phytic acid | 0.3 weight parts |

Formula 9

| | |
|---|---|
| Nonylphenol polyoxyethylene ether | 51.19 weight parts |
| Methylamine | 15 weight parts |
| Phosphoric acid | 5 weight parts |
| Phytic acid | 8 weight parts |

Formula 10

| | |
|---|---|
| Nonylphenol polyoxyethylene ether | 91.19 weight parts |
| Ethylenediamine | 3 weight parts |
| Phosphoric acid | 0.3 weight parts |
| Phytic acid | 0.5 weight parts |

Formula 11

| | |
|---|---|
| Nonylphenol polyoxyethylene ether | 70 weight parts |
| Triethanolamine | 9 weight parts |
| Phosphoric acid | 2 weight parts |
| Phytic acid | 4 weight parts |

Formula 12

| | |
|---|---|
| Nonylphenol polyoxyethylene ether | 80 weight parts |
| Tetrabutylammonium bromide | 12 weight parts |
| Phosphoric acid | 3 weight parts |
| Phytic acid | 6 weight parts |

Formula 13

| | |
|---|---|
| Nonylphenol polyoxyethylene ether | 60 weight parts |
| Aniline | 6 weight parts |
| Phosphoric acid | 4 weight parts |
| Phytic acid | 2 weight parts |

Although the above mentioned formulas are different in components, they have the similar reduction effect. The physical and chemical properties as well as the principles of anti-oxidation of the anti-oxidative agent for molten metal are described as below.

The anti-oxidative agent for molten metal of the invention is a light yellow transparent oily liquid, with specific gravity of $1.07 \pm 0.05$ g/cm$^3$ and a slight fragrance. The agent can be stored in a plastic bottle (a vessel) and the service life thereof can last for about 2 years at a dark and cool place under normal temperature (between −5 and 40° C.). Its working temperature is between 183 and 300° C., without flashing point. In use, the agent produces no smoke, no smell, and no pollution, is easily introduced, and no need to upgrade the original ventilation system.

Different from the agents in prior art, the anti-oxidative agent for molten metal of the invention is a water-soluble oily liquid, easy for practice, no splash produced when added to a molten metal liquid. When poured onto the liquid surface of a molten metal, the water-soluble oily agent spreads quickly and automatically to cover the whole surface.

The working principle of anti-oxidation and reduction of the agent are described as follows:

1. Cut Off Oxygen and Reduce Oxidation

When poured onto the liquid surface of a molten metal, the agent spreads quickly and covers the whole liquid surface, and then a protective membrane formed, so the oxygen is cut off and the oxidation decreased.

2. Break Up Metal Dross and Reduce Target Metal

When added to a liquid surface of molten metal, the agent will enter the gaps of metal dross and reduce the surface tension thereof. Subsequently, the metal dross breaks up quickly, and the target metal is reduced and regained.

3. Reduce Surface Tension and Enhance Binding Effect

The active substance (surfactant) of the agent can alter the surface tension of the molten metal, so that the fluidity and binding capacity of the molten metal are enhanced.

Studies show the reduction efficiency of the invention is between 85 and 95%, the fluidity and binding capacity of the molten metal are increased by more than 20%, and the cost per working section is decreased by between 30 and 50%.

Preferably, a method of anti-oxidation of a molten metal is described as below.

1. Reduce the Flow of Molten Metal

Principle: the more molten metal flows at the surface, the more oxide produced. Thus, reducing the flow of molten metal can reduce the oxide amount and save the agent.

Method: inserting 3-5 stainless steel sheets between 3 and 5 cm deep into the molten metal liquid. Thus, the flow of molten metal at the surface is confined to a small area, and that below the steel sheets is normal as before, and no need to upgrade the original working mode.

2. Collect and Reduce Metal Dross Randomly

Principle: At the liquid surface of a molten metal, the flowing or protruding part is generally oxidized seriously. Collecting the metal dross at the surface and reducing directly can achieve a good effect.

Method: disposing a U-shaped mesh screen on a vessel which is used to load the molten metal, the molten metal freely passing through the mesh screen but oxidized metal dross not, the edge of the vessel being between 1 and 2 cm higher than the metal liquid level. The collected metal dross is reduced with the agent for the invention immediately. Thus, the metal dross will not float everywhere, and no metal dross exists on the surface of the molten metal after adding the agent.

In combination with the above methods, the reduction efficiency of the agent for the invention is much higher, the resultant economic effect is better.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An anti-oxidative agent for molten metal comprising nonylphenol polyoxyethylene ether, organic amine, phosphoric acid, and phytic acid.

2. The anti-oxidative agent for molten metal of claim 1, wherein said nonylphenol polyoxyethylene ether is between 51.19 and 91.19 weight parts, said organic amine is between 3 and 15 weight parts, said phosphoric acid is between 0.3 and 5 weight parts, and said phytic acid is between 0.5 and 8 weight parts.

3. The anti-oxidative agent for molten metal of claim 1, further comprising an essence.

4. A method of preparing the anti-oxidative agent for molten metal of claim 1 comprising
   a) heating said organic amine to between 60 and 100° C., adding said nonylphenol polyoxyethylene ether, and stirring for between 3 and 5 min to yield a mixture; and
   b) cooling the mixture to between 30 and 100° C., and adding said phosphoric acid and said phytic acid with stirring for between 10 and 15 min.

5. A method of preventing oxidation of molten metal, comprising: applying the anti-oxidative agent for molten metal of claim 1 to a molten metal.

6. The method of claim 5, wherein said applying comprises directly pouring said anti-oxidative agent onto said molten metal.

7. The method of claim 5, wherein said applying comprises a) inserting between 3 and 5 stainless steel sheets between 3 and 5 cm deep into the molten metal liquid so as to confine the flow thereof on the surface to a small area, and b) pouring said anti-oxidative agent onto the surface of the flow part of said molten metal.

8. The method of claim 5, wherein said applying comprises a) disposing a U-shaped mesh screen on a vessel which is used to load said molten metal, said molten metal freely passing through the mesh screen but oxidized metal dross not, the edge of the vessel being between 1 and 2 cm higher than the metal liquid level, and b) pouring said anti-oxidative agent onto the liquid surface of the molten metal in the mesh screen.

9. An anti-oxidative agent for molten metal comprising nonylphenol polyoxyethylene ether, cyclohexylamine hydrobromide, diphenyl guanidine hydrobromide, phosphoric acid, and phytic acid.

10. The anti-oxidative agent for molten metal of claim 9, wherein said nonylphenol polyoxyethylene ether is between 51.19 and 91.19 weight parts, said cyclohexylamine hydrobromide is between 5 and 20 weight parts, said diphenyl guanidine hydrobromide is between 3 and 15 weight parts, said phosphoric acid is between 0.3 and 5 weight parts, and said phytic acid is between 0.5 and 8 weight parts.

11. The anti-oxidative agent for molten metal of claim 9, further comprising an essence.

12. A method of preparing the anti-oxidative agent for molten metal of claim 9 comprising
  a) melting said cyclohexylamine hydrobromide and said diphenyl guanidine hydrobromide, adding said nonylphenol polyoxyethylene ether, and stirring for between 3 and 5 min to yield a mixture; and
  b) cooling the mixture to between 30 and 100° C., and adding said phosphoric acid and said phytic acid with stirring for between 10 and 15 min.

13. A method of anti-oxidation of molten metal comprising applying the anti-oxidative agent for molten metal of claim 9 to a molten metal.

14. The method of claim 13, wherein said applying comprises directly pouring said anti-oxidative agent onto said molten metal.

15. The method of claim 13, wherein said applying comprises a) inserting between 3 and 5 stainless steel sheets between 3 and 5 cm deep into the molten metal liquid so as to confine the flow thereof on the surface to a small area, and b) pouring said anti-oxidative agent onto the surface of the flow part of said molten metal.

16. The method of claim 13, wherein said applying comprises a) disposing a U-shaped mesh screen on a vessel which is used to load said molten metal, said molten metal freely passing through the mesh screen but oxidized metal dross not, the edge of the vessel being between 1 and 2 cm higher than the metal liquid level, and b) pouring said anti-oxidative agent onto the liquid surface of the molten metal in the mesh screen.

\* \* \* \* \*